(12) United States Patent
Berger et al.

(10) Patent No.: US 7,373,977 B1
(45) Date of Patent: May 20, 2008

(54) PROCESS FOR OIL RECOVERY EMPLOYING SURFACTANT GELS

(75) Inventors: Paul Daniel Berger, Sugar Land, TX (US); Christie Huimin Berger, Sugar Land, TX (US)

(73) Assignee: Oil Chem Technologies, Sugar Land, TX (US)

( * ) Notice: Subject to any disclaimer, the term of this patent is extended or adjusted under 35 U.S.C. 154(b) by 194 days.

(21) Appl. No.: 11/081,232

(22) Filed: Mar. 16, 2005

Related U.S. Application Data

(60) Provisional application No. 60/557,346, filed on Mar. 29, 2004.

(51) Int. Cl.
*E21B 43/20* (2006.01)
*E21B 43/22* (2006.01)
*C09K 8/584* (2006.01)
*C09K 8/588* (2006.01)

(52) U.S. Cl. .................. 166/270.1; 166/275; 507/240; 507/244; 507/265; 507/936

(58) Field of Classification Search ............. 166/270.1, 166/275, 305.1, 400; 507/211, 213, 216, 507/225, 240, 244, 265, 936
See application file for complete search history.

(56) References Cited

U.S. PATENT DOCUMENTS

| | | | |
|---|---|---|---|
| 3,939,911 A | | 2/1976 | Maddox, Jr. et al. |
| 4,130,491 A | | 12/1978 | Wagner et al. |
| 4,146,499 A | * | 3/1979 | Rosano .................. 252/186.32 |
| 4,193,452 A | | 3/1980 | Wilson et al. |
| 4,216,097 A | * | 8/1980 | Stournas ...................... 507/240 |
| 4,554,974 A | | 11/1985 | Kalpakci et al. |
| 4,703,797 A | * | 11/1987 | Djabbarah ............... 166/252.1 |
| 4,825,950 A | | 5/1989 | Kalpakci et al. |
| 6,043,391 A | | 3/2000 | Berger et al. |
| 6,569,814 B1 | * | 5/2003 | Brady et al. ................. 507/201 |
| 6,831,108 B2 | | 12/2004 | Dahanayake et al. |
| 2004/0082484 A1 | | 4/2004 | Dahanayake et al. |
| 2004/0176478 A1 | | 9/2004 | Dahanayake et al. |
| 2004/0214725 A1 | | 10/2004 | Moss |
| 2007/0107897 A1 | * | 5/2007 | Dahanayake et al. ....... 166/271 |

OTHER PUBLICATIONS

Domingo, Betaines Chapter 1 In Amphoteric Surfactants $2^{nd}$ Edition, Surfactant Science Series, E. Lomax ed., Marcel Dekker N.Y. (1996).

* cited by examiner

*Primary Examiner*—George Suchfield

(57) ABSTRACT

A process for recovering oil by injecting into a subterranean oil-bearing reservoir through one or more injection wells, an aqueous solution containing one or more amphoteric alkyl amido betaine surfactants that form a viscoelastic gel reducing interfacial tension and increasing the viscosity of the injection fluid simultaneously, displacing the solution into the reservoir, and recovering the oil from one or more production wells. These viscoelastic gels are tolerant to electrolytes and multivalent cations. They are shear reversible and adsorbed little onto the reservoir. Their viscosity is reduced when contacting certain hydrocarbons but remains high when contacting water or brine. This allows the fluid to preferentially penetrate the oil-bearing portions of the formation and resulting additional oil recovery. These viscoelastic surfactant gels are particularly suitable for use with reservoirs and brines characterized by medium to high temperatures, higher salinity, higher concentrations of divalent cations, and low formation porosities.

17 Claims, 2 Drawing Sheets

RESIDUAL OIL RECOVERY TEST

Oil Recovery Using B0503-2

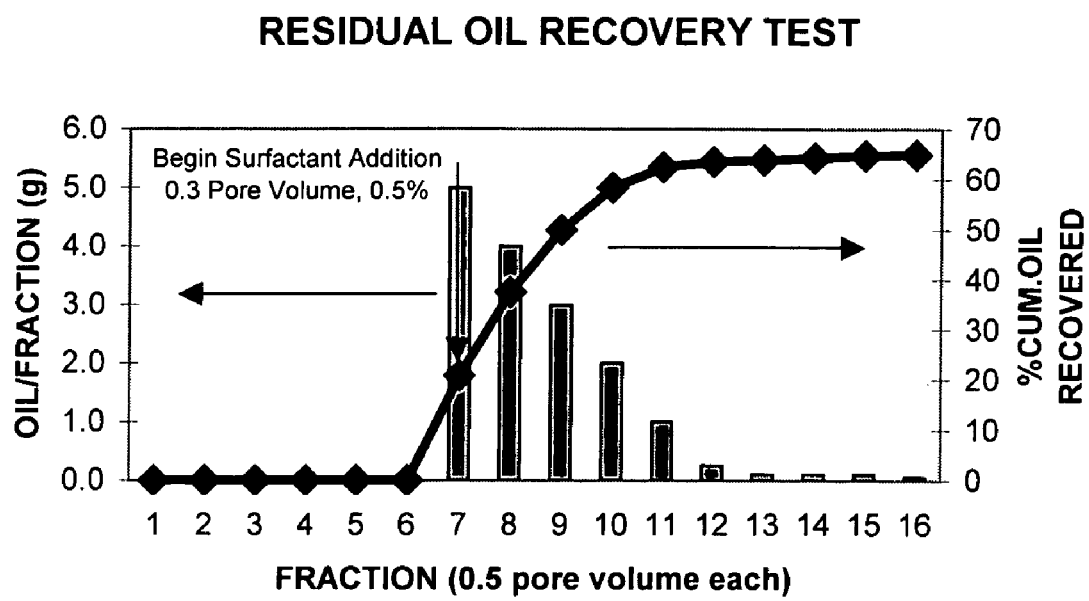
Figure 1. Oil Recovery Using B0503-2

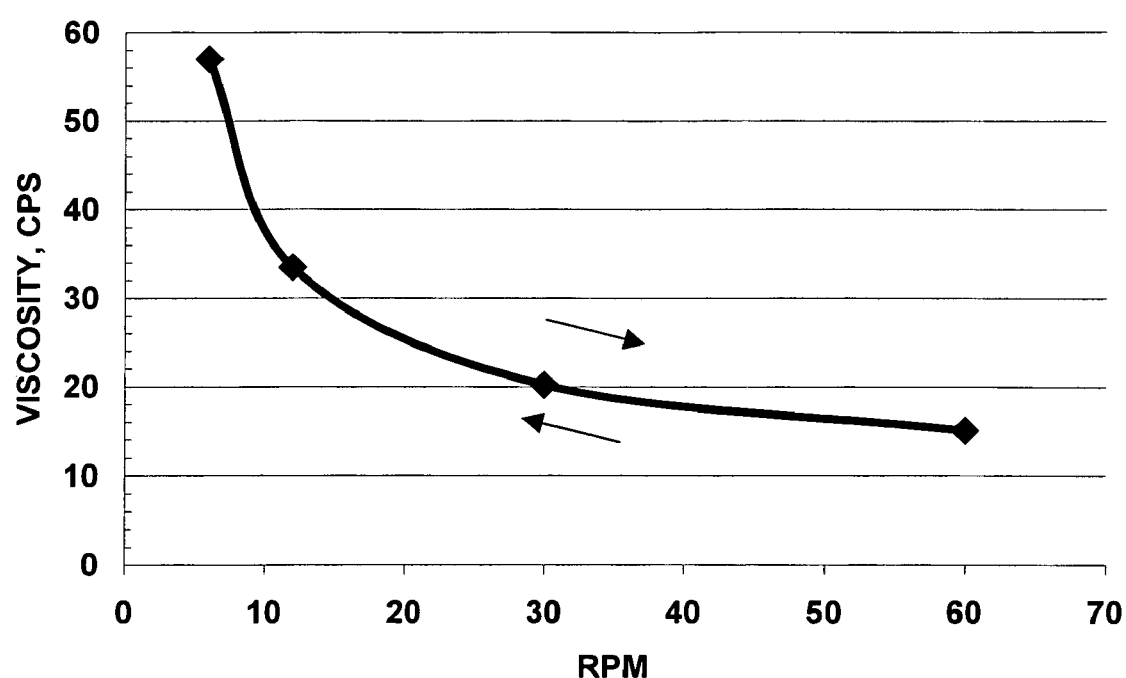
Figure 2. Viscosities at various RPM using 0.5% B0503-3 in seawater.

PROCESS FOR OIL RECOVERY EMPLOYING SURFACTANT GELS

CROSS REFERENCE TO RELATED APPLICATIONS

This application is based on provisional application Ser. No. 60/557,346, filed on Mar. 29, 2004.

STATEMENT REGARDING FEDERALLY SPONSORED RESEARCH OR DEVELOPMENT

Not Applicable

DESCRIPTION OF ATTACHED APPENDIX

Not Applicable

FIELD OF THE INVENTION

This invention relates to the field of Enhanced Oil Recovery (EOR). More specifically, it relates to a composition and process containing viscoelastic surfactant gels that have both surfactant and gelling properties that simultaneously provides low water/oil interfacial tension (IFT) and increases the viscosity of the injection fluid used for residual oil recovery.

BACKGROUND OF THE INVENTION

Crude oil is generally recovered from an oil-bearing reservoir by three processes, designated primary, secondary and tertiary recovery. The latter is also known as Enhanced Oil Recovery. In primary recovery the oil is produced through a producer well by taking advantage of the pressure exerted on underground pools of oil by gas or water present with the oil. Approximately 20% of the original oil in place (OOIP) is recovered by this process. Once the pressure has been exhausted, other means of recovering the remaining oil must be employed. In secondary recovery the well may be re-pressurized with gas or water injected through one or more injection wells to recover approximately an additional 20% of the OOIP. Other secondary recovery methods include acidizing, fracturing, water flood, etc. After secondary recovery means have been exhausted, EOR processes can be employed to recover additional oil up to approximately 60% OOIP.

Many EOR techniques have been disclosed in the past yet the EOR process is not widely used by the industry for several reasons. For example, in the EOR processes employing chemicals, petroleum sulfonates and synthetic alkylaryl sulfonates are predominantly used as the surfactant to lower the interfacial tension (IFT) between the residual oil and the injection fluid in order to overcome the capillary forces trapping the oil. Partially hydrolyzed polyacrylamides are generally employed as the viscosifier for mobility control. Both the polymers and surfactants used are not salt and multivalent cation tolerant and therefore either a fresh water source or pre-treatment of the injection water is required. Also, a costly hydration unit is often required for the polymer in order to properly dissolve and develop its viscosity. Furthermore, often a high concentration of the surfactant is required for proper oil displacement, or, alkali is used with the surfactant to enhance the interfacial tension and reduce the surfactant adsorption. In addition, the polyacrylamide may precipitate and cause serious formation damage when contacting the connate water containing multivalent cations. Most polymers are not stable at temperatures above 140° C. and are irreversibly degraded by shear. The huge up-front investment and product limitations currently discourage the wide use of the EOR process. This is especially the case for many marginal fields, owned by smaller independent companies even though the fields contain considerable residual oil reserves.

The present invention relates to the composition and process for injecting amphoteric viscoelastic surfactant gels into a subterranean oil bearing formation through one or more injection wells, displacing the fluid into the formation and recovering oil from one or more production wells. The viscoelastic surfactant gels contain amphoteric surfactants, commonly known as betaines. These are used alone or in combination with certain other surfactants and/or polymers in an aqueous injection fluid, to reduce the interfacial tension (IFT) between brines and crude oils and increase the viscosity of the injection brine.

There are many citations in the prior art that have recognized the use of various amphoteric surfactants for water flood and other oil recovery processes. U.S. Pat. No. 3,939,911 describes a three-surfactant system containing a water soluble salt of an alkyl or alkylaryl sulfonate, a phosphate ester surfactant and sulfonated betaine for oil recovery in formations having high temperature and high concentrations of polyvalent ions. U.S. Pat. No. 4,130,491 describes the use of naphthenic acid based betaines for recovering mineral oil from oil deposits.

U.S. Pat. No. 4,193,452 employs a surface active amphoteric quaternary ammonium sulfonate and an aliphatic alcohol containing 5 to 8 carbon atoms to produce a thicken injection fluid for waterflooding. U.S. Pat. No. 4,216,097 uses amphoteric surfactants having an inner quaternary ammonium group linked to a terminal sulfonated or carboxylate group to reduce the oil-water interfacial tension in relatively high salinity aqueous media that include the presence of significant quantities of divalent metal ions. The amphoteric betaines used in this case are based on tertiary amines they do not increase the viscosity of the injected fluid as do the alkyl amido betaines of the present invention. They are primarily used to lower the IFT between the injection fluid and the residual oil. As explained in the example included in U.S. Pat. No. 4,216,097, xanthan gum was used as a mobility control agent.

U.S. Pat. No. 4,554,974 discloses a method for recovering petroleum from a subterranean reservoir by injecting an aqueous slug of a mixture of amphoteric surfactant to reduce the interfacial tension and a high molecular weight polysaccharide gum as the thickener.

U.S. Pat. No. 4,825,950 uses a betaine as an IFT lowering surfactant along with two different polymers to form an electrolyte tolerant injection fluid for oil recovery. The first polymer is primarily for thickening and the second is used to prevent the first polymer and the surfactant from interfering with each other through interaction and/or precipitation.

U.S. Pat. No. 6,831,108 and recent US Patent Applications 2004/0082484 and 2004/0176478 use zwitterionic/amphoteric surfactants such as dihydroxyl alkyl glycinate, alkyl amido ampho acetate or propionate, alkyl betaine, alkyl amidopropyl betaine and alkyl imino mono and di-proprionates derived from certain waxes, fats and oils in viscoelastic surfactant based aqueous fluids systems useful as thickening agents in conjunction with an inorganic water-soluble salt or organic additives such as phthalic acid, salicylic acid or their salts for suspending particles during the excavation of geologic formations. Also the intent of the viscoelastic fluids of the above citations is not to recover residual oil from subterranean reservoirs by injecting through one or more injection wells and producing the oil from one or more production wells, as is the intent of the present invention.

The recent US Patent Application 2004/0214725 employs quaternary ammonium salts and alkyl amido amine salts of inorganic acids and/or organic acids to produce viscoelastic aqueous systems. These fluids are suggested for use in fracturing, gravel packing, drilling, completion fluids, as well as several non-oilfield based applications None of these examples of the prior art disclose the use of amphoteric surfactants, preferably alkyl amido betaines, specifically chosen and designed to be used in aqueous injection fluids and especially in produced brine without any water treatment or water softening to provide both low IFT and mobility control for the recovery of residual oil by injection into one or more injection wells, displacing the fluid into the formation, and recovering the oil from one or more production wells.

OBJECT OF THE INVENTION

The present invention includes a composition for recovering crude oil using amphoteric surfactants, specifically alkyl amido betaines, designed to be used alone or in combination with certain other surfactants and/or polymers in an aqueous injection fluid, to simultaneously reduce the IFT between water/oil and to increase the viscosity of the injection brine, and a process for recovering oil by (a) injecting an effective amount of said composition into a subterranean hydrocarbon containing formation through one or more injection wells and (b) displacing the fluid into the formation, and recovering the oil from one or more production wells.

The present invention requires minimum up-front investment and equipment for injection. In most cases, the produced water can be used as the injection water without any costly water treatment, softening and sludge disposal. It also minimizes any potential damage to the formation that may be caused by the incompatibility of the injected chemicals with the formation.

BRIEF DESCRIPTION OF THE INVENTION

The present invention provides a new and improved EOR composition and process of recovering crude oil using one or more amphoteric surfactants that are characterized by the following structure:

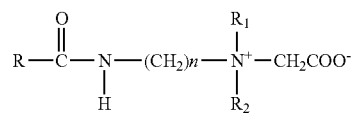

Where,

R is C12 to C30 alkane or alkylene, R1 and R2 are the same or different and preferably represent a low molecular weight alkyl residue, especially straight-chain alkyl residue with 1 to 4 carbon atoms, or hydroxy alkane; and n is 2 to 6.

This amphoteric surfactant(s) is chosen and designed to be used alone to simultaneously reduce the IFT between water and oil and to increase the viscosity of the injection brine, or it can be used in combination with certain other surfactants and/or polymers in an aqueous injection fluid composition to recover oil by (a) injecting an effective amount of said composition into a subterranean oil containing formation through one or more injection wells, and (b) displacing the fluid into the formation, and recovering the oil through one or more production wells.

DESCRIPTION OF FIGURES

FIG. 1 shows the oil recovered using a composition containing 0.5% by weight of a soya amidopropyl dimethyl betaine/arylalkyl sulfonate blend (B0503-2).

FIG. 2 shows the viscosity versus shear rates using a canola amidopropyl dimethyl betaine (B0503-3) in seawater.

DETAILED DESCRIPTION OF THE INVENTION

The present invention provides a new and improved EOR composition and process of recovering crude oil using one or more amphoteric surfactants that are characterized by the following structure:

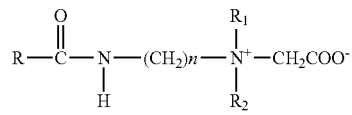

Where,

R is C12 to C30 alkane or alkylene, R1 and R2 are the same or different and preferably represent a low molecular weight alkyl residue, especially straight-chain alkyl residue with 1 to 4 carbon atoms, or hydroxy alkane; and n is 2 to 6.

This amphoteric-surfactant(s) is chosen and designed to be used alone to simultaneously reduce the IFT between water/oil and to increase the viscosity of the injection brine, or it can be used in combination with certain other surfactants and/or polymers in an aqueous injection fluid composition to recover oil by (a) injecting an effective amount of said composition into a subterranean oil-bearing formation through one or more injection wells, and (b) displacing the fluid into the formation, and recovering the oil through one or more production wells. The amphoteric surfactant is used in amounts form about 0.15 to about 10% by weight, the amount chosen to give the desired IFT lowering and viscosity increase deemed necessary to recover residual oil.

The alkyl amido betaines of the present invention are derived from any of a number of fatty acids and glycerides. Fatty acids include, but are not limited to, lauric, lauroleic, myristic, myristoleic, palmitic, palmitoleic, stearic, isostearic, oleic, linoleic, ricinoleic, licanic, eleostearic, arachidic, behenic, docosenic, lignoceric, tetracosanoic, and other saturated, unsaturated and polyunsaturated acids in the C12 to C30 range. Glycerides that can be used, include but are not limited to those found in, canola oil, castor oil, coconut oil, corn oil, cotton seed oil, herring oil, jojoba oil, lard oil, linseed oil, menhaden oil, mustard seed oil, oiticica oil, olive oil, palm oil, palm kernel oil, peanut oil, perrilla oil, rapeseed oil, sunflower seed oil, sperm oil, tall oil, tallow, tung oil, whale oil, and other oils containing mixtures of C12 to C30 fatty acids as their glycerides.

The alkyl amido betaines are produced by any of the commonly known methods of manufacturing betaines including, but not limited to, the reaction of an alkyl amidopropyl amine with sodium chloroacetate or chloroacetic acid. A thorough description of the structures, properties and methods of preparation of various betaines can be found in Chapter 3 Betaines by Xavier Domingo in *Amphoteric Surfactants 2nd Edition*, Surfactant Science Series, E. Lomax ed., Marcell Dekker (1996).

The use of the betaines derived from these fatty acids and glycerides offers many advantages. They are produced from renewable resources. They are easily and inexpensively manufactured. They are readily biodegradable. They are generally non-toxic to marine, mammalian and plant life. In many case, they provide both the functions of lowering IFT and increasing viscosity in a wide range of salinities and multivalent ion containing brines.

We have found that the amphoteric alkyl amido betaine surfactants having the structure above have both unique viscoelastic gel properties and IFT reduction properties in certain water/oil systems and that they are ideally suited for Enhanced Oil Recovery applications. These betaines are distinguishable from other amphoterics because they can only exist in the cationic form in strong acid and the nonionic form at higher pH values. Other amphoterics can exist in their cationic form at low pH, as nonionics at an intermediate pH and as anionic surfactants at higher pH. Also the alkyl amido betaines of this invention are preferred over other betaines such as alkyl dimethyl betaines because they can form viscoelastic solutions at relatively low concentrations and in most cases can also lower the IFT of the viscoelastic surfactant gel solution against hydrocarbons. However, in certain cases, alkyl dimethyl betaines can be combined in relatively low concentrations with alkyl amido betaines to form systems that lower IFT and increase viscosity and this combination is within the scope of our invention. In some cases the amphoteric viscoelastic surfactant gels of the present invention chosen for a typical application are the mixtures of one or more different alkyl amido betaines in order to optimize their properties. This is especially true where naturally occurring fats and oils are used as the starting materials to synthesize them. These naturally occurring fats and oil are mixtures of fatty acids and the amphoteric alkyl amido betaines derived from them are likewise mixtures.

The present invention provides a composition having both the viscosity required for mobility control and low IFT required to overcome the capillary forces trapping residual oil. The present invention is tolerant to electrolytes and multivalent cations and stable at high temperatures with minimal adsorption onto the formation. The present invention is particular suitable for conditions where the existing technology is technically or economically unfeasible, such as for formations having low permeabilities, processes employing injection brines and/or connate water of high salinity and high multivalent cation concentrations and for reservoirs that have been channeled by previous waterflooding.

The compositions of the present invention using viscoelastic surfactant gel containing alkyl amido betaines may lose their viscosity upon contacting crude oil or other hydrocarbons. This characteristic results in preferential flow of the viscoelastic surfactant gel through those portions of the formation that contain significant residual oil saturation resulting in additional displacement of oil.

Because of the different properties of the formation, crude oil, connate brine, injection brine, bottom hole temperature, etc., other constituents including other surfactants may be used with the amphoteric alkyl amido betaine surfactant to further enhance its IFT and viscosity properties. The secondary surfactants may be any of those generally known to those familiar with the art and include anionic, nonionic or cationic surfactants. The concentrations of these secondary surfactants used are generally from about 0.01% to about 5% by weight.

Polymers may be used to provide residual viscosity control when the viscosity provided by the amphoteric alkyl amido betaine surfactant has been reduced significantly upon contact with the oil in the reservoir. This residual viscosity is used to prevent the injection fluid from over-riding the oil. The optional polymer maybe chosen from a number of polymers generally known to those familiar with the art including but not limited to polyacrylamide, xanthan gum, guar gum, and cellulose. Polyacrylamide is the preferred polymer for this application and the concentration used is from about 0.01% to about 0.5% by weight.

Also, we have found that it is very important to chose and design the proper alkyl amido betaine(s) for the oil/water system where it is to be employed in order to optimize IFT lowering and viscosity building properties under the applied field conditions.

The following examples further illustrate the object and the desirable properties obtained with the present invention.

EXAMPLE 1

This example illustrates the use of an amphoteric alkyl amido betaine surfactant derived from naturally occurring vegetable oils, to simultaneously lower the IFT of the brine/oil and increase the viscosity of the brine for an Asian oil field application.

The amphoteric surfactant, designated as B0503-1, was prepared by reacting 0.333 mole of soybean oil with 1.000 mole of dimethyl amino propyl amine (DMAPA). The resulting soya amidopropyldimethyl amine was further reacted with sodium chloroacetate in the presence of the proper amount of a 1:1 by weight mixture of water and butyl cellosolve to produce the soya amidopropyldimethyl betaine (sample no. B0503-1) with an active concentration of 50% by weight.

The brine from an Asian oil field, designated as Oil Field A, contained 32,000 ppm total dissolved solids, 1,850 ppm of the multivalent cations, and the crude oil had an API Gravity of 22. The bottom hole temperature was 60° C.

The IFT was measured using a University of Texas Model 500 Spinning Drop Tensiometer after spinning for a period of 30 minutes. The viscosity of the brine-surfactant mixture was measured using a Brookfield LVT viscometer at 60° C. The results of these measurements are shown in Table 1.

TABLE 1

| IFT and Viscosity properties for Field A | | |
|---|---|---|
| B05030-1, conc., % wt | 0.30% | 0.50% |
| IFT, mN/m | 0.0014 | 0.0038 |
| Visc @ 12 RPM, cps | 21 | 39 |
| Visc @ 30 RPM, cps | 18 | 27 |

The data in Table 1 shows that the B0503-1 provides both low IFT and sufficient viscosity for Oil Field A. The samples were then aged for 30 days in an oven set at 60° C. and no apparent changes in the IFT or viscosity were observed.

EXAMPLE 2

This example illustrates that B0503-1 from example 1 does not provide low IFT in Oil Field B—a west Texas Oil Field. This problem was resolved by adding an anionic surfactant along with the B0503-1 to give acceptable IFT and viscosity values.

The brine from the Field B contained 13,500 ppm total dissolved solids, 620 ppm multivalent cations and the crude oil had an API Gravity of 18. The bottom hole temperature was 48° C. B0503-2 was prepared by adding 1 part by weight of the sodium salt of C1416 arylalkyl xylene sulfonic acid, designated XSA-1416 and prepared as described according to U.S. Pat. No. 6,043,391, to 10 parts by weight of B0503-1. As shown in Table 2, B0503-1 used alone did not provide low IFT and proper viscosity in the oil and brine from Oil Field B. However, by adding the anionic surfactant the IFT was lowered and the viscosity was increased.

TABLE 2

IFT and Viscosity Properties for Oil Field B

|  | B0503-1, 0.5% | B0503-2, 0.5% |
|---|---|---|
| IFT, mN/m | 0.094 | 0.0085 |
| Visc @ 12 RPM, cps | 12 | 35 |
| Visc @ 30 RPM, cps | 8 | 24 |

EXAMPLE 3

This example illustrates the oil recovery obtained from columns packed with crushed core from Oil Field B.

Two separate but identical columns were prepared by adding 150 grams of the oil saturated crushed core from Oil Field B to glass chromatography columns 7 inches long and 1 inch in diameter. The oil saturated crushed core was prepared by mixing 16% by weight of the crude oil with 84% by weight of the crushed core. The columns were carefully prepared to eliminate air during packing. The Pore Volume (PV) of the columns was determined to be approximately 70% or 105 ml. This is the amount of liquid required for one displacement through the column. Each column contained 150 g×0.16=24 g oil. Injection field brine was passed through the bottom of each column and collected in fractions of approximately 0.5 PV (approximately 52.5 ml) each from the top. The brine was injected into the bottom of the columns until all the free oil was removed. Then an additional 3.5 PV of the brine was injected prior to the addition of 0.3 PV (equivalent to 31.5 ml) of a 0.5% by weight of B0503-2 in brine to column A. This was followed by injection brine. Effluents were collected and the amount of oil recovered was measured. Only brine was injected into Column B as the control. The data shown in Table 3 indicates that a total of more than 15.55 grams or 65% oil was recovered from column A and no oil was recovered from column B. This example shows that chemical flooding using the composition and process of the present invention can remove significant amount of the oil remaining after water-flooding.

TABLE 3

Oil Recovered From Crushed Core Packed Column Test

| PV | Column A | Column B |
|---|---|---|
| 0.5 | 0 | 0 |
| 1.0 | 0 | 0 |
| 1.5 | 0 | 0 |
| 2.0 | 0 | 0 |
| 2.5 | 0 | 0 |
| 3.0 | 0 | 0 |
| 3.5* | 5 | 0 |
| 4.0 | 4 | 0 |
| 4.5 | 3 | 0 |
| 5.0 | 2 | 0 |
| 5.5 | 1 | 0 |
| 6.0 | 0.25 | 0 |
| 6.5 | 0.1 | 0 |
| 7.0 | 0.1 | 0 |
| 7.5 | 0.1 | 0 |
| 8.0 | >0.1 | 0 |

*begin injection of 0.3 PV of 0.5% B0503-2 in Column A only

FIG. 1 shows the detailed results obtained when 0.3 PV of a 0.5 weight percent B0503-2 was used in column A.

EXAMPLE 4

This example illustrates the synergistic effect obtained when using combinations of amphoteric alkyl amido betaine surfactants, anionic surfactants and polymers. The amphoteric alkyl amido betaine surfactant gels trend to lose their viscosity when contacting certain hydrocarbons. Additional polymer can be added to maintain the residual viscosity required for mobility control. This example uses oil and brine from a Kansas oil field, designated as Oil Field C, contained 8,300 ppm total dissolved solids, 80 ppm divalent cations and the crude oil had an API Gravity of 23 with a bottom hole temperature of 32° C.

A canola amidopropyl dimethyl betaine, designated B0503-3, was prepared using the procedure as described in example 1, using canola oil as the fatty acid source. It can be seen from Table 4 that the viscosity of the brine solution containing 0.45% B0503-3 provided an IFT of 0.092 mN/m and a viscosity of 62 cps. Linear dodecylbenzene sulfonate, designated as LAB-1, was used as the additional anionic surfactant to enhance the IFT and viscosity properties. The data in Table 4 shows that 0.05% of the LAB-1 precipitated in the brine from Oil Field C due to its intolerance to high concentrations of salt and multivalent cations. However, LAB-1 did not precipitate when added as an additional secondary surfactant along with B0503-3. The combination of the two surfactants performed synergistically to provide an IFT of 0.055 mN/m and a viscosity of 81 cps. The addition of the polymer provided residual viscosity for mobility control since the viscosity provided by the B0503-3 was found to decrease dramatically when contacting the oil from Oil Field C. Without being bound by any particular theory, we believe the amphoteric alkyl amido betaine surfactant complexes with the anionic surfactant to form a wormlike structure having high viscosity and preventing the anionic surfactant from precipitation when contacting the multivalent cations present in the brine. When these micelles contact oil, the wormlike structure breaks up freeing the surfactant and allowing it to lower the IFT but also lowering the viscosity of the viscoelastic surfactant gel solution. Polymer is not affected by contact with oil so when it is included it provides some residual viscosity aft er the wormlike structures are broken by the oil. Thus the combination of amphoteric alkyl amido betaine surfactant and the anionic surfactant can increase the viscosity of the injection fluid and is preferentially directed to oil-bearing sections of the formation where the surfactant is freed to lower the IFT and overcome the capillary forces trapping the oil. The polymer then provides enough residual viscosity to mobilize the freed oil. In cases where low viscosity oil is encountered the polymer may not be necessary to provide residual viscosity.

TABLE 4

Synergistic Effects

| Sample No. | Description | IFT, mN/m | Viscosity, cps |
|---|---|---|---|
| A | 0.05% LAB-1 | Precipitate | Precipitate |
| B | 0.45% B0503-3 | 0.092 | 62 |
| C | A + B before contact with oil | 0.055 | 81 |
| D | A + B after contact with oil | 0.0042 | 2.7 |
| E | 0.010% Polymer | 2.8 | 10 |
| F | Sample C + Sample E | 0.099 | 90 |
| G | Sample D + Sample E | 0.0051 | 11 |

EXAMPLE 5

This example illustrates the superior viscosity characteristics of the compositions of the present invention. The test data shows the viscosity of the viscoelastic surfactant gel is shear sensitive but reversible. Lower viscosities are expected when the amphoteric viscoelastic surfactant gel is pumped into the reservoir at high shear and higher viscosities will be re-established when the shear is diminished within the reservoir.

FIG. 2 shows the viscosity versus shear rate using 0.5 percent by weight B0503-3 in seawater. Viscosities were measured at 25° C. using a Brookfield Model LVT viscometer at various RPM. The data in FIG. 2 shows the viscosity is very high, reaching 57 CPS, at the lower shear rate of 6 RPM and is 15.1 CPS at the higher shear rate of 60 RPM. The shear thinning properties were foamed to be completely reversible.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

What is claimed is:

1. A process for recovering oil by injecting a composition into a subterranean oil bearing formation through one or more injection wells, displacing the fluid into the formation and recovering oil from one or more production wells said composition comprising:
   a) one or more amphoteric surfactants chosen for their ability to both lower interfacial tension and increase viscosity,
   b) an aqueous based medium,
   c) optionally one or more polymers to provide residual viscosity:
and;
recovering the oil from one or more producing wells.

2. The process for recovering oil described in claim 1 where the one or more amphoteric surfactants are present in amounts of about 0.1% to about 10% by weight of the composition.

3. The process for recovering oil described in claim 1 where the one or more amphoteric surfactants have the following structure:

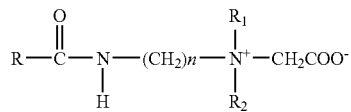

Where,
R is C12 to C30 alkane or alkylene, and n is 2 to 6, R1 and R2 are each independently a low molecular weight residue which is a straight chain alkyl residue or a hydroxy alkane with 1 to 4 carbon atoms.

4. The process for recovering oil described in claim 1 where the aqueous medium is water.

5. The process for recovering oil described in claim 1 where the aqueous medium is water containing salts of mono and multivalent cations.

6. The process for recovering oil described in claim 1 where the aqueous medium is an oilfield brine.

7. The process for recovering oil described in claim 1 where the polymer optionally used to provide residual viscosity is used at concentrations from about 0.01% to about 0.5% weight.

8. The process for recovering oil described in claim 1 where the polymer optionally used to provide residual viscosity is a polymer chosen from: polyacrylamide, partially hydrolyzed polyacrylamide, xanthan gum, guar gum, hydroxyethyl cellulose.

9. A process for recovering oil by injecting a composition into one or more injection wells, displacing the fluid into the formation and recovering oil from one or more production wells said composition comprising:
   a. one or more amphoteric surfactants chosen for their ability to both lower interfacial tension and increase viscosity,
   b. an aqueous medium,
   c. a secondary surfactant, and;
   d. optionally one or more polymers to provide residual viscosity:
and;
recovering the oil from one or more producing wells.

10. The process for recovering oil described in claim 9 where the one or more amphoteric surfactants are present in the amounts of about 0.1% to about 10% by weight.

11. The process for recovering oil described in claim 9 where the one or more amphoteric surfactants have the following structure:

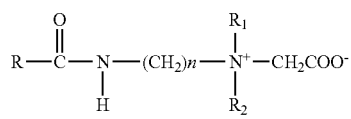

Where,
R is C12 to C30 alkane or alkylene, and n is 2 to 6, R1 and R2 are each independently a low molecular weight residue which is a straight chain alkyl residue a hydroxy alkane with 1 to 4 carbon atoms.

12. The process for recovering oil described in claim 9 where the aqueous medium is water.

13. The process for recovering oil described in claim 9 where the aqueous medium is water containing salts of mono and multivalent cations.

14. The process for recovering oil described in claim 9 where the aqueous medium is an oilfield brine.

15. The process for recovering oil described in claim 9 where the secondary surfactant is chosen from the group: anionic, non ionic, cationic surfactant.

16. The process for recovering oil described in claim 9 where the polymer used to provide residual viscosity is a polymer chosen from the group: polyacrylamide, partially hydrolyzed polyacrylamide, xanthan gum, guar gum, hydroxyethyl cellulose.

17. The process for recovering oil described in claim 9 where the polymer used to provide residual viscosity is used at concentrations from about 0.01% to about 0.5% by weight.

* * * * *